United States Patent [19]

Hosaka

[11] Patent Number: 5,572,663
[45] Date of Patent: Nov. 5, 1996

[54] HIGHLY RELIABLE INFORMATION PROCESSOR SYSTEM

[75] Inventor: Kazuhide Hosaka, Tokyo, Japan

[73] Assignee: NEC Corporation, Tokyo, Japan

[21] Appl. No.: 992,642

[22] Filed: Dec. 18, 1992

[30] Foreign Application Priority Data

Dec. 19, 1991 [JP] Japan .................. 3-336696

[51] Int. Cl.⁶ .................................. G06F 11/00
[52] U.S. Cl. .................. 395/182.1; 364/229.4; 364/943.92; 371/36
[58] Field of Search .................. 395/575, 182.1, 395/182.09, 182.08; 371/9.1, 8.1, 11.1, 11.3, 36; 364/229, 229.4, 230.4, 943.91, 944.2, 944.3, 944.61, 943.92, 944

[56] References Cited

U.S. PATENT DOCUMENTS

| | | | |
|---|---|---|---|
| 4,270,715 | 6/1981 | Norton et al. | 371/36 |
| 4,562,575 | 12/1985 | Townsend | 371/9 |
| 4,583,224 | 4/1986 | Ishii et al. | 371/36 |
| 4,616,312 | 10/1986 | Uebel | 364/200 |
| 4,757,442 | 7/1988 | Sakata | 395/182.1 |
| 4,967,347 | 10/1990 | Smith et al. | 364/200 |
| 5,136,595 | 8/1992 | Kimura | 371/68.3 |
| 5,138,708 | 8/1992 | Vosbury | 395/575 |
| 5,278,843 | 1/1994 | Ako | 371/36 |
| 5,305,325 | 4/1994 | Roos | 371/3 |

*Primary Examiner*—Robert W. Beausoliel, Jr.
*Assistant Examiner*—Trinh L. Tu
*Attorney, Agent, or Firm*—Foley & Lardner

[57] ABSTRACT

A highly reliable information processor system of the present invention takes in the bus cycle start signals which are output to notify outside devices of the timings where the first to third microprocessors start their bus cycles so as to compare them with each other and, detects any malfunction of a microprocessor based on discrepancy in start timing among bus cycles. When it judges that the first microprocessor in execution mode malfunctions, it logically isolates the first microprocessor operating in execution mode and causes either of the second or third microprocessors operating in monitor mode to enter execution mode. After such degradation from triple-processor configuration to double-processor configuration, it executes again the bus cycle which has been executed at the time of malfunction detection.

8 Claims, 11 Drawing Sheets

FIG. 2

TRUTH TABLE FOR J-K TYPE FLIP-FLOP

| J | K | Q | $\overline{Q}$ |
|---|---|---|---|
| 0 | 0 | Q | $\overline{Q}$ |
| 0 | 1 | 0 | 1 |
| 1 | 0 | 1 | 0 |
| 1 | 1 | $\overline{Q}$ | Q |

VALUE CHANGES AT LEADING
EDGE OF CLOCK

Q = 0 AND $\overline{Q}$ = 1 WHEN RESET (NOT SHOWN)

FIG. 5

TRUTH TABLE FOR D TYPE FLIP-FLOP

| D | Q |
|---|---|
| 0 | 0 |
| 1 | 1 |

VALUE CHANGES AT LEADING
EDGE OF CLOCK

Q = 0 WHEN RESET

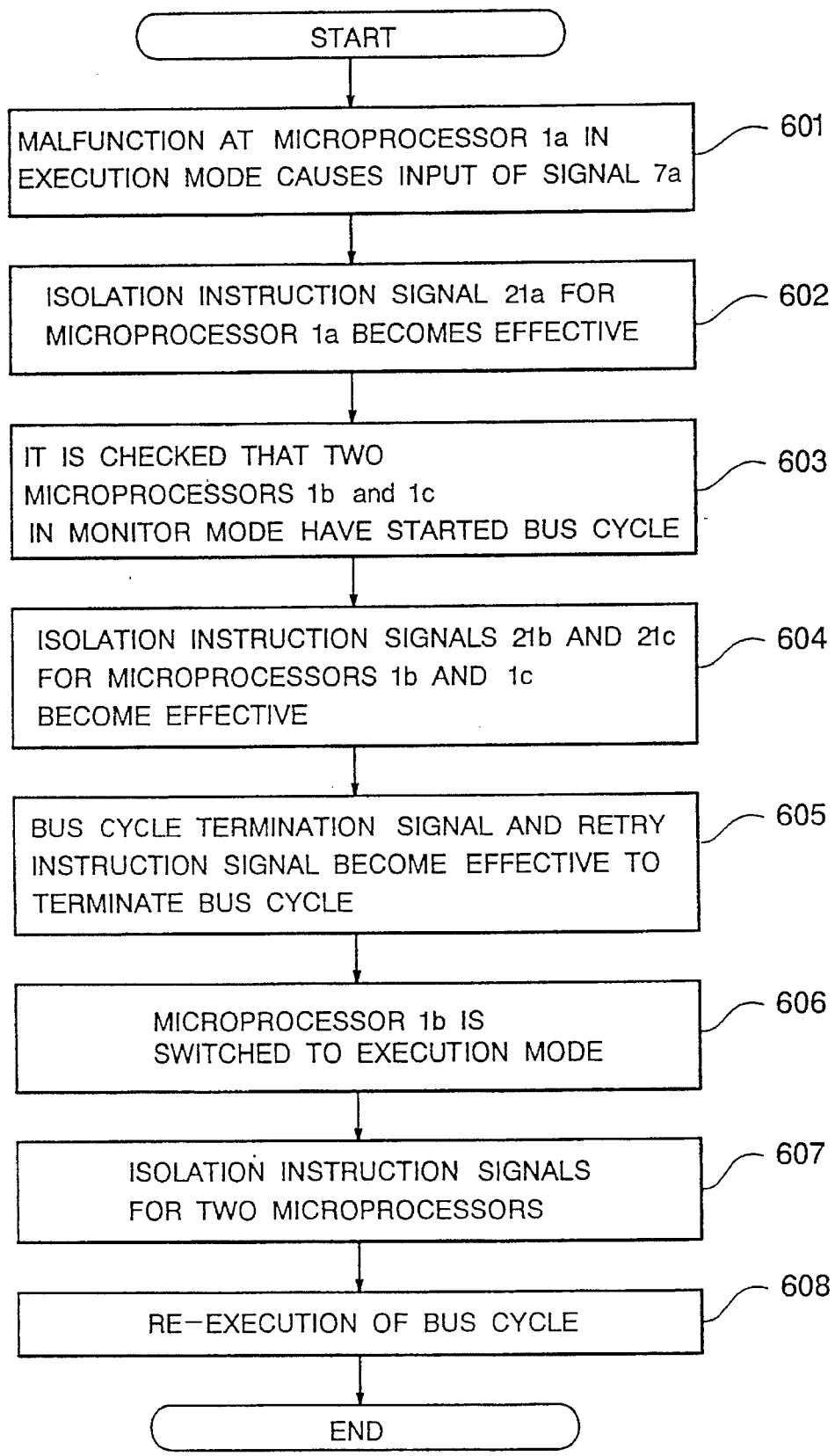

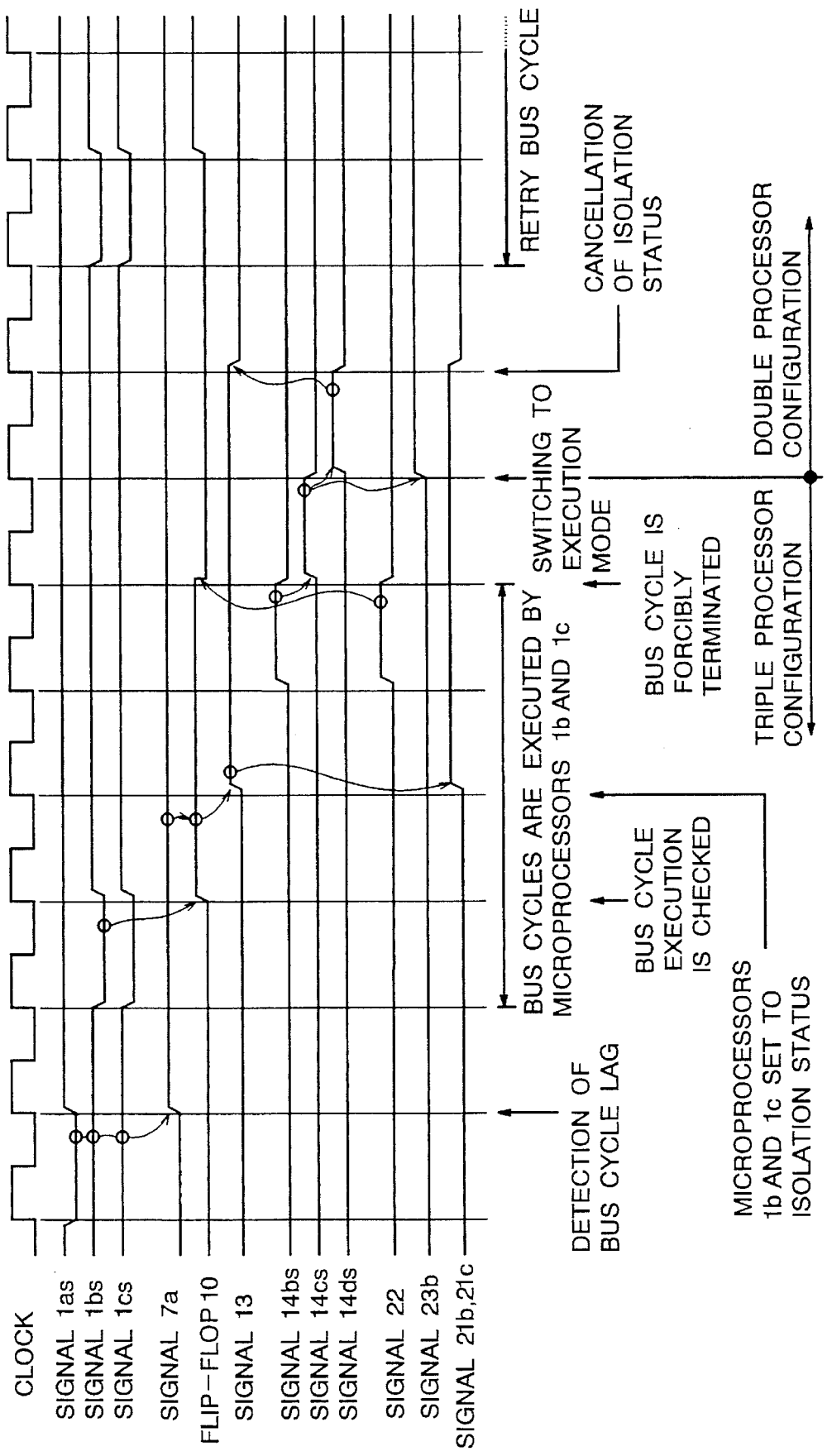

HIGHLY RELIABLE INFORMATION PROCESSOR SYSTEM

BACKGROUNDS OF THE INVENTION

1. Field of the Invention

The present invention relates to a highly reliable information processor system where a high reliability is required, and particularly relates to a highly reliable information processor system provided with fault tolerant capability to allow temporary malfunctions at microprocessors.

2. Description of the Prior Art

A highly reliable information processor system conventionally has a redundant triple-microprocessor configuration to avoid discontinuance of processing because of temporary malfunctions. Such a system is provided with three microprocessors, and any malfunctioning microprocessor among them can be easily identified by decision of majority through monitoring of the outputs from the microprocessors. When a malfunction is detected, the malfunctioning microprocessor is isolated and the remaining two microprocessors continue processing.

Functional Redundancy Monitor (FRM) method enables relatively easy embodiment of such a triple-processor configuration. In a FRM system, two microprocessors in monitor mode take in the signal output to an outside from another microprocessor operating in execution mode so as to check the signal against their own signals each time a bus cycle is activated.

According to the principle of triple majority decision, when a discrepancy is found at either of the monitor mode microprocessors, the microprocessor where the discrepancy occurs is malfunctioning. If discrepancies are found at both of the two monitor mode microprocessors, then the microprocessor in execution mode is malfunctioning.

Another well-known example of triple majority decision is a system where all the signals output from the three microprocessors are subjected to triple majority decision outside of the system and then the result is transferred to another unit (memory, for example). In this case, there is no concept of execution mode and all microprocessors output signals to the outside in the same way.

Triple majority decision can be expressed by the following formula:

$$Y=A*B+B*C+C*A$$

where A, B and C are the three signals and "*" means AND and "+" means OR. As understood from this formula, the value indicated by two or three of the three signals A, B and C is given to the output Y. Thus, it can be said that the output Y always has a proper value unless more than one error occurs at a time.

Thus, in a conventional highly reliable information processor system provided with FRM capability, the output signal is checked each time a bus cycle is activated. This method is effective when the three microprocessors simultaneously activate bus cycles, certainly. However, such a system cannot detect or can detect only with a delay a malfunction which causes discrepancy in timing among the bus cycles themselves.

For example, if a microprocessor in monitor mode does not activate a bus cycle, the conventional system cannot detect such a malfunction. If the microprocessor in execution mode activates a bus cycle earlier than the microprocessors in monitor mode, the malfunction may be detected only after termination of the bus cycle. In order to properly continue processing with a degraded double-processor system even after malfunction detection, the bus cycle during which the malfunction occurs needs to be activated again, which means that the malfunction must be detected while the bus cycle is still being activated.

Temporary malfunctions at a highly integrated microprocessor are mostly caused by reversing of a flip-flop inside the microprocessor. This reversing, however, is only temporary, and the flip-flop with reversing is restored when new data is written to that flip-flop. If a system stops its processing upon such a temporary error, it can be said to have a low reliability.

Flip-flops inside a processor can be classified into those for data processing and those for control, and the majority of the flip-flops are used for data processing. However, reversing of a bit in a large scale register for instruction storage may cause the instruction involving that bit to be interpreted as an instruction different from the original one. This surely changes the internal sequence and results in discrepancy in bus cycle timings. The ratio of such malfunctions with shifting of bus cycles is not ignorable.

On the other hand, the method using an external circuit for triple majority decision where all output signals are subjected to majority decision is certainly quite advantageous. It can detect all malfunctions, does not at all adversely affect other devices and enables processing to be continued without any suspension. However, it requires all the output signals to pass the triple majority decision circuit, which delays the transfer of address, data and other signals to another unit, resulting in lower performance. In addition, the triple majority decision circuit itself requires a considerably large-scale hardware. Such lowering of performance and increase of component quantity are fatal drawbacks, for they are against the modern request for higher performance, lower cost, smaller size and lower power consumption.

SUMMARY OF THE INVENTION

It is a first object of the present invention to provide a highly reliable information processor system which eliminates the above drawback and assures detection of a malfunction with discrepancy in bus cycle timing.

It is a second object of the present invention to provide a highly reliable information processor system which isolates the malfunctioning execution mode microprocessor and switches another microprocessor in monitor mode to execution mode to reconfigure a system and thereby prevent discontinuance of continued processing.

It is a third object of the present invention to provide a highly reliable information processor system which, if the bus cycle being executed when the microprocessor in execution mode makes a malfunction is writing to the memory, inhibits such writing to the memory to avoid unreliable memory writing based on the malfunction.

It is a fourth object of the present invention to provide a highly reliable information processor system which can restore the system with a configuration degraded due to the malfunction to the original system configuration promptly.

According to a preferred embodiment of the present invention to attain the first object, a highly reliable information processor system comprises a first microprocessor which operates in execution mode, second and third processors which operate in monitor mode to check the signal output from the first processor in execution mode against their own signals and which start their bus cycles synchronizing with the first microprocessor, and a malfunction detecting means which detects any malfunction of one of the microprocessors based on the bus cycle start signals output by the first to third microprocessors for start timing information when they synchronously start their triple bus cycles by comparing such start signals to find discrepancy among the cycles.

According to a further preferred embodiment of the present invention, the malfunction detecting means in a highly reliable information processor system comprises three exclusive-OR gates each of which selects two out of three bus cycle start signals from the microprocessors and three AND gates each of which selects two of the outputs from the exclusive-OR gates and outputs a malfunction signal corresponding to each of the microprocessors.

According to a still preferred embodiment of the present invention, the malfunction detecting means in the highly reliable information processor system further comprises a holding means to hold the malfunction signal for each of the AND gates.

According to another preferred embodiment to attain the second object of the present invention, a highly reliable information processor comprises a first microprocessor which operates in execution mode, second and third processors which operate in monitor mode to check the signal output from the first processor in execution mode against their own signals and which start their bus cycles synchronizing with the first microprocessor, a malfunction detecting means which detects any malfunction of one of the microprocessors based on the bus cycle start signals output by the first to third microprocessors for start timing information when they synchronously start their triple bus cycles by comparing such start signals to find discrepancy among the cycles, a reconfiguration means which, when the malfunction detecting means judges that the first microprocessor in execution mode makes a malfunction, logically isolates the first microprocessor in execution mode and switches either of the second or third microprocessors in monitor mode into execution mode for degradation from triple- to double-processor configuration, and then executes the bus cycle on the way at the time of malfunction detection.

According to a still preferred embodiment of the present invention, the reconfiguration means in a highly reliable information processor system comprises a means to output a signal to instruct the microprocessors to retry the bus cycle on the way upon input of both of the malfunction signal for the first microprocessor and the bus cycle start signals from the second and third microprocessors at a time, an isolation signal output means to output an isolation signal to logically isolate one of the first to third microprocessors synchronously with the retry instruction signal, a bus cycle termination signal output means to output a signal to terminate the currently ongoing bus cycle based on the isolation signal, a means to output a signal to switch the second or third microprocessor from monitor mode to execution mode based on the bus cycle termination signal and a means to inactivate the isolation signal upon the switching signal.

According to a further preferred embodiment, the isolation signal output means in a highly reliable information processor system is an OR gate where the retry instruction signal and the malfunction signal corresponding to the first microprocessor are input.

According to another preferred embodiment, the bus cycle termination signal output means in a highly reliable information processor system comprises a differentiation circuit to convert the isolation signal to a pulse signal having a width of one clock and a delay circuit to output the pulse signal as the bus cycle termination signal with a delay of certain clocks.

According to further preferred embodiment, a highly reliable information processor system further comprises an isolation means which, when it is judged that the second or third microprocessor operating in monitor mode makes a malfunction, logically isolates the malfunctioning second or third microprocessor.

According to still another embodiment to attain the third object of the present invention, a highly reliable information processor system further comprises a write inhibit means which inhibits the memory write signal to disable data write to the memory when the malfunction detecting means judges that the first microprocessor in execution mode made a malfunction.

According to a further preferred embodiment, the write inhibit means in a highly reliable information processor system masks the memory write signal upon input of the malfunction signal for the first microprocessor and the switching signal to switch the second or third microprocessor to execution mode.

According to still another preferred embodiment, the write inhibit means in a highly reliable information processor system further comprises an AND gate to which the malfunction signal for the first microprocessor and the switching signal to switch the second or third microprocessor to execution mode are input and an OR gate to which the output from the AND gate and the memory write signal are input.

According to still another embodiment to attain the fourth object of the present invention, a highly reliable information processor system further comprises an interruption means to issue an interruption for each of the microprocessors in response to detection of a malfunction at one of the first to third microprocessors by the malfunction detecting means and a reset means to reset and initialize the first to third microprocessors upon the interruption.

According to a further preferred embodiment, the reset means in a highly reliable information processor system comprises a circuit which generates a reset signal to reset the microprocessors for a certain period under control by the microprocessors which accepted the interruptions.

Other objects, characteristics and effects of the present invention will be clarified in the detailed description below.

BRIEF DESCRIPTION OF THE DRAWINGS

FIG. 2 is a diagram to show the truth table for a J-K type flip-flop used in FIG. 1;

FIG. 5 is a diagram to show the truth table for a D type flip-flop used in FIG. 4;

FIG. 6 is a flowchart to illustrate the system reconfiguration operation by the highly reliable information processor system shown in FIG. 4;

FIG. 7 is a timing chart to show an example where the microprocessor in execution mode makes a malfunction and a microprocessor in monitor mode enters execution mode, and the two microprocessors in monitor mode are reconfigured as double-processor configuration for operation.

DESCRIPTION OF THE PREFERRED EMBODIMENT

Referring now to the attached figures, preferred embodiments of the present invention will be described below.

Figure 1:
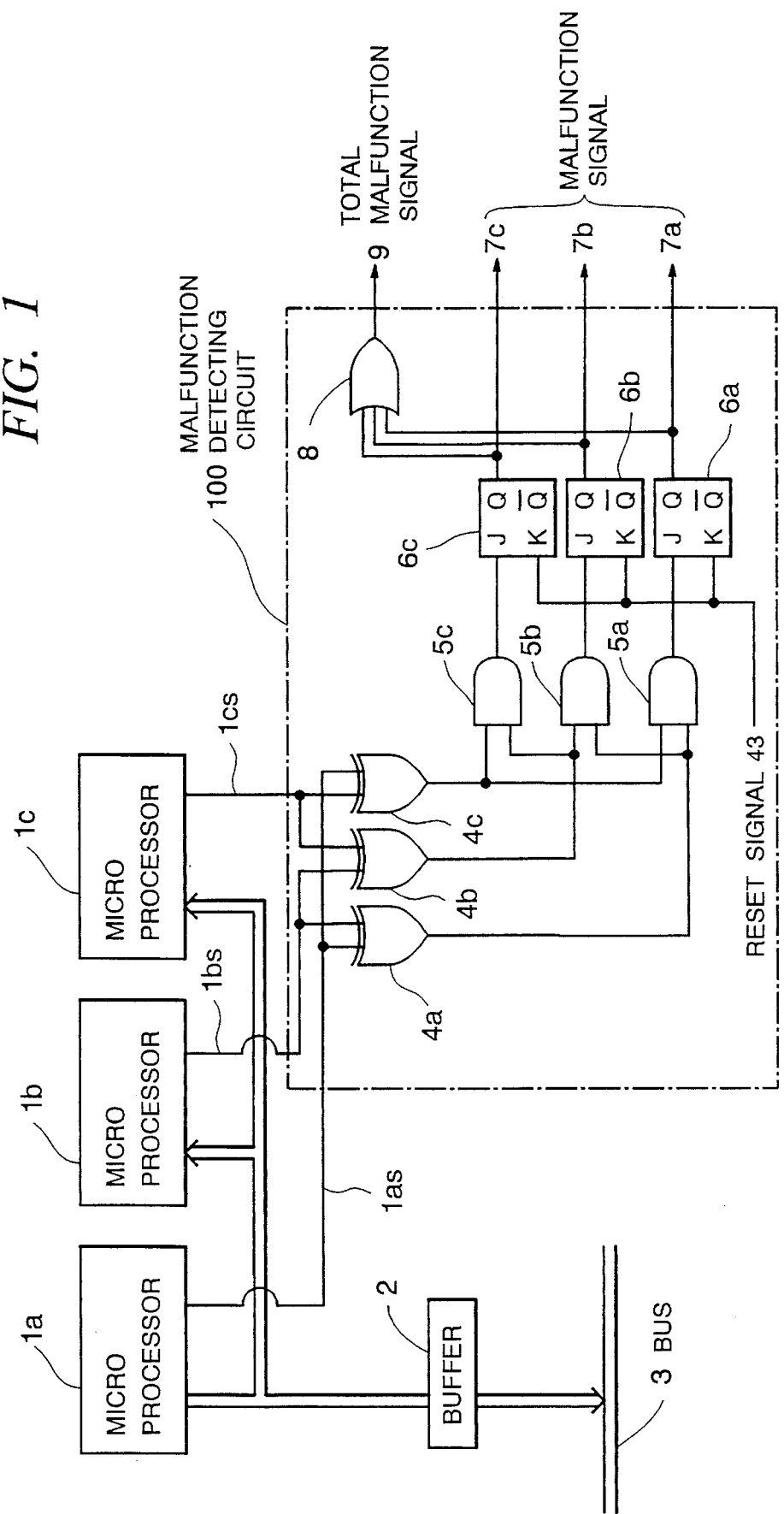
FIG. 1 is a block diagram to show a highly reliable information processor system according to an embodiment to attain the first object of the present invention.

FIG. 1 is a block diagram to show a highly reliable information processor system according to an embodiment to attain the first object of the present invention. In the figure, a highly reliable information processor system has a triple-processor configuration with a microprocessor 1a (in execution mode) for actual processing execution and microprocessors 1b and 1c (in monitor mode) for monitoring the operation of the microprocessor 1a.

The microprocessor 1a operating in execution mode and the microprocessors 1b and 1c operating in monitor mode are connected, via a buffer 2, with a bus 3. The microprocessors 1a to 1c activate synchronized bus cycles.

Usually, the microprocessors 1b and 1c take in the signals output from the microprocessor 1a to check them against the data at each of these microprocessors 1b and 1c. According to the principle of triple majority decision, when a discrepancy is found at the microprocessor 1b only, the microprocessor 1b is malfunctioning; when a discrepancy is found at the microprocessor 1c only, the microprocessor 1c is malfunctioning. If discrepancies are found at the microprocessors 1b and 1c at the same time, it means that the microprocessor 1a is malfunctioning.

The microprocessors 1b and 1c check the signals output from the microprocessor 1a when they activate their bus cycles. Accordingly, if the bus cycles of the three microprocessors 1a, 1b and 1c are completely synchronized, faults such as data errors can be detected through this checking.

The three microprocessors 1a, 1b and 1c output the bus cycle start signals 1as, 1bs and 1cs to the outside to inform other devices of timing at which their bus cycles start. In other words, the bus cycle start signals 1as, 1bs and 1cs are pulse signals which are made effective for only one clock cycle when the applicable bus cycle starts.

The microprocessors 1a, 1b and 1c are connected with a malfunction detecting circuit 100 to detect any malfunction based on discrepancy of bus cycle timing among the microprocessors 1a, 1b and 1c.

The malfunction detecting circuit 100 comprises exclusive-OR gates 4a, 4b and 4c and two-input AND gates 5a, 5b and 5c, J-K type flip-flops 6a, 6b and 6c and an OR circuit 8. The malfunction detecting circuit 100 detects the microprocessor which made a malfunction according to the principle of triple majority decision.

To the exclusive-OR gates 4a, 4b and 4c, different combinations comprising two of the bus cycle start signals 1as, 1bs and 1cs from the microprocessors 1a, 1b and 1c are input. Specifically, the exclusive-OR gate 4a receives the bus cycle start signals 1as and 1bs, the exclusive-OR gate 4b receives the bus cycle start signals 1bs and 1cs, and the exclusive-OR gate 4c receives the bus cycle start signals 1as and 1cs.

To the AND gates 5a, 5b and 5c, different combinations comprising two of the outputs from the exclusive-OR gates 4a, 4b and 4c are sent. Specifically, the AND gate 5a receives the outputs from the exclusive-OR gates 4a and 4c, the AND gate 5b receives the outputs from the exclusive-OR gates 4a and 4b, and the AND gate 5c receives the outputs from the exclusive-OR gates 4b and 4c. The outputs from the AND gates 5a, 5b and 5c are sent to the J-K type flip-flops 6a, 6b and 6c. These J-K type flip-flops 6a, 6b and 6c are provided to keep the outputs from the AND gates 5a, 5b and 5c and all of them have the value "0" in usual operation.

These J-K type flip-flops 6a, 6b and 6c output malfunction signals 7a, 7b and 7c corresponding to the microprocessors 1a, 1b and 1c. The malfunction signals 7a, 7b and 7c are input to the three-input OR gate 8, which in turn outputs a total malfunction signal 9. For the malfunction signals 7a, 7b and 7c and the total malfunction signal 9, the value "1" means the occurrence of a malfunction and "0" means usual operation.

The malfunction detecting circuit 100 constantly monitors the bus cycle start signals 1as, 1bs and 1cs to check for any discrepancy in timing among bus cycles (whether the bus cycles are synchronized or not). If the signal 1as becomes effective earlier or later than the two other signals 1bs and 1cs, then the J-K type flip-flop 6a is set to "1". If the signal 1bs becomes effective earlier or later than two other signals 1as and 1cs, then the J-K type flip-flop 6b is set to "1". Similarly, if the signal 1cs becomes effective earlier or later than two other signals 1as and 1bs, then the J-K type flip-flop 6c is set to "1".

Accordingly, a malfunction at the microprocessor 1a causes the malfunction signal 7a to change to "1", a malfunction at the microprocessor 1b causes the malfunction signal 7b to change to "1", and a malfunction at the microprocessor 1c causes the malfunction signal 7c to change to "1".

Once changed to "1", each of three J-K type flip-flops 6a, 6b and 6c keeps the value "1" until a software reset signal 43 becomes effective. FIG. 2 shows a truth table for the flip-flops 6a, 6b and 6c. The total malfunction signal 9 is a logical sum of the malfunction signals 7a, 7b and 7c obtained from the OR gate 8. A value "1" at this total malfunction signal 9 means that any of the microprocessors 1a, 1b and 1c makes a malfunction. This enables proper judgment of malfunction known by discrepancy in timing among bus cycles.

Figure 3:
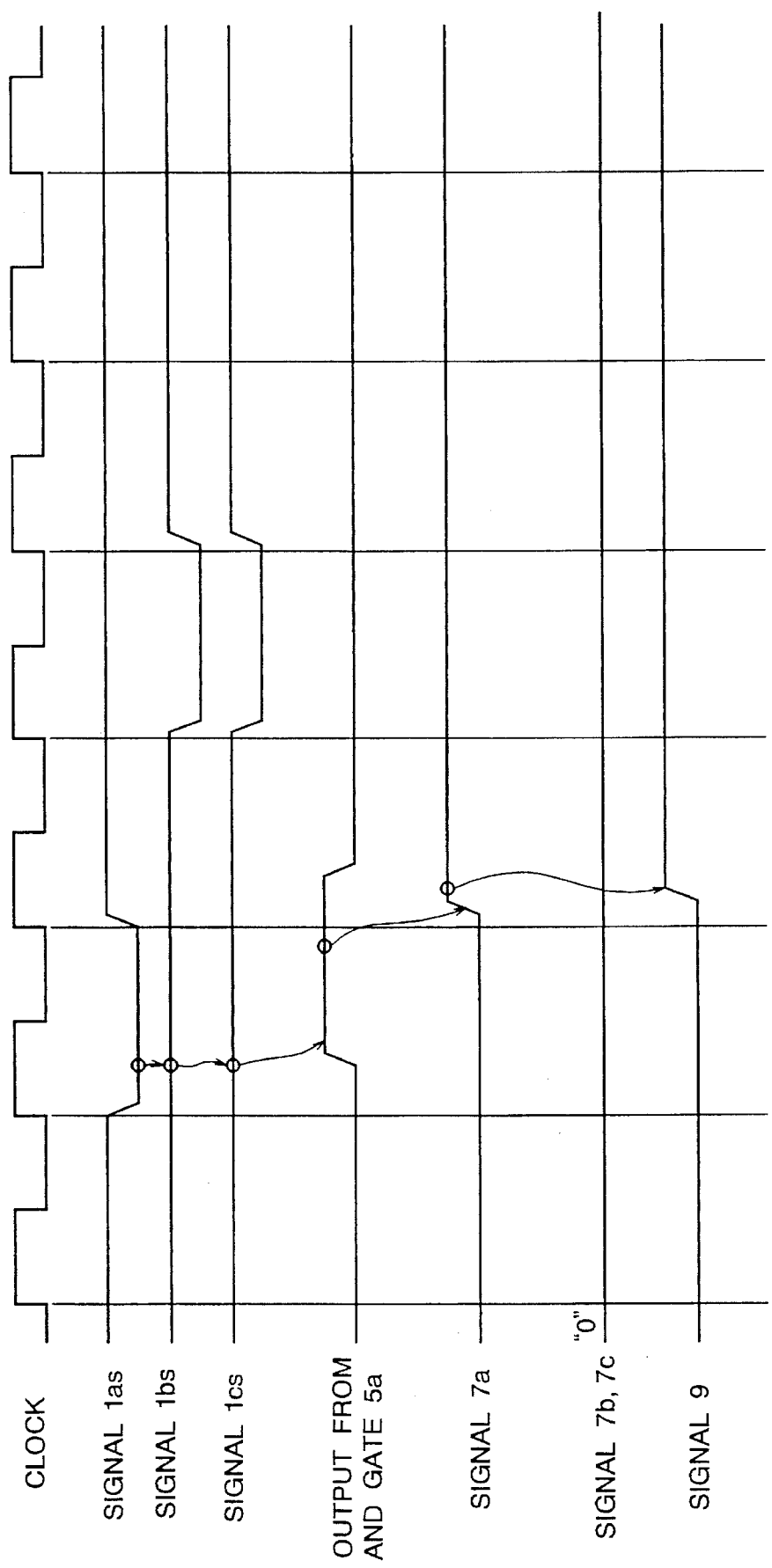
FIG. 3 is a timing chart to show an example of malfunction detection where the microprocessor in execution mode starts its bus cycle earlier than the others.

FIG. 3 is a timing chart showing an example where the microprocessor 1a starts its bus cycle earlier than the other microprocessors 1b and 1c. As shown in FIG. 3, when the bus cycle start signal 1as of the microprocessor 1a becomes effective earlier than the bus cycle start signals 1bs and 1cs of the microprocessors 1b and 1c, the outputs from the exclusive-OR gates 4a and 4c become "1". This results in a "1" being input to the two input terminals at the AND gate 5a, which outputs "1". This causes the malfunction signal 7a and the total malfunction signal 9 to change to "1". The other malfunction signals 7b and 7c are "0". Change of the malfunction signal 7a to "1" indicates that the microprocessor 1a has made a malfunction.

Figure 4:
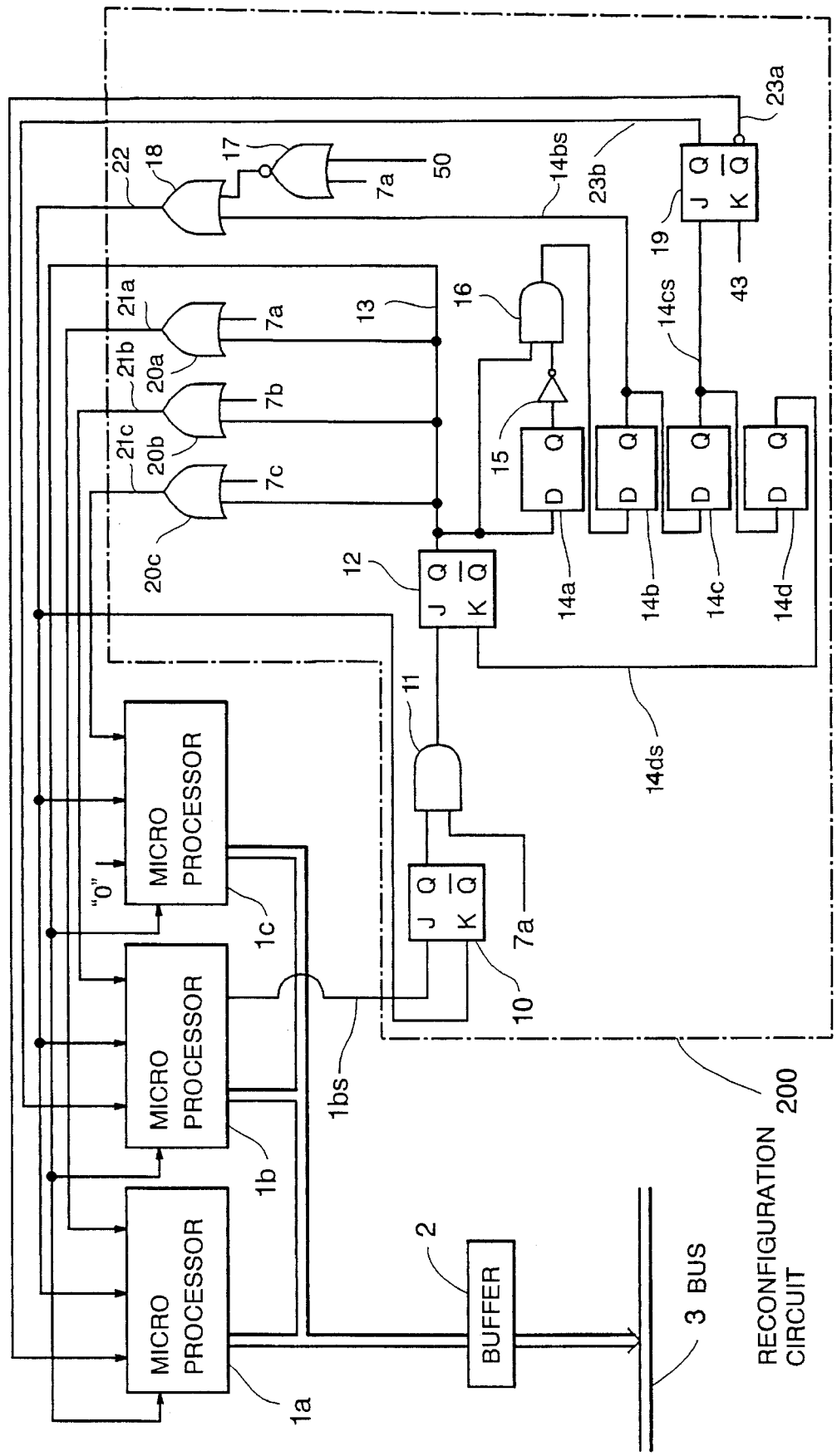
FIG. 4 is a block diagram to show a highly reliable information processor system according to an embodiment to attain the second object of the present invention.

FIG. 4 is a block diagram to show the configuration of a highly reliable information processor system of the present invention provided with a reconfiguration circuit which switches the microprocessor mode after detection of a malfunction and retries the ongoing bus cycle with reactivating the bus cycle after reconfiguration.

The highly reliable information processor system of FIG. 4 is actually provided with a malfunction detecting circuit 100 as shown in FIG. 1, but it is omitted here for the sake of convenience.

A reconfiguration circuit 200 comprises a J-K type flip-flop 10, an AND gate 11, a J-K type flip-flop 12, D type flip-flops 14a, 14b, 14c and 14d, a NOT gate 15, an AND gate 16, a NOR gate 17, an OR gate 18 and a J-K type flip-flop 19, and OR gates 20a, 20b and 20c.

The bus cycle start signal 1bs from the microprocessor 1b is reversed before input to the J-K type flip-flop 10. The output from the flip-flop 10 and the malfunction signal 7a corresponding to the microprocessor 1a as shown in FIG. 1 are sent to the AND gate 11, whose output is in turn input to the flip-flop 12. The flip-flop 12 outputs a retry instruction signal 13 to instruct reactivation of the applicable bus cycle.

The malfunction signals 7a, 7b and 7c and the retry instruction signal 13 are input to the OR gates 20a, 20b and 20c, which in turn output isolation instruction signals 21a, 21b and 21c to electrically isolate the applicable microprocessor from the system.

The retry instruction signal 13 as the output from the flip-flop 12 is further input to the D-type flip-flop 14a and the AND gate 16. The AND gate 16 also receives the output from the D-type flip-flop 14a at the other input terminal via the NOT gate 15. The output from the AND gate 16 is sent to the D-type flip-flop 14b, which serves as a delay circuit. The output from the flip-flop 14b is sent as a pulse signal 14bs to the OR gate 18 and to the D-type flip-flop 14c at the next stage serving as a delay circuit.

The output from the D-type flip-flop 14c is, as a pulse signal 14cs, sent to the flip-flop 19 for microprocessor mode switching and to the D-type flip-flop 14d at the next stage serving as a delay circuit. The reset terminal at the flip-flop 19 receives a software reset signal 43. A pulse signal 14ds as the output of the D-type flip-flop 14d is input to a reset terminal at the flip-flop 12. The flip-flop 19 outputs operation mode instruction signals 23a and 23b to switch the operation mode. FIG. 5 shows the truth table for the D-type flip-flops 14a, 14b, 14c and 14d.

The other input terminal at the OR gate 18 receives the output from the NOR gate 17. The NOR gate 17 receives the malfunction signal 7a and a bus cycle termination signal 50, which is generated when no malfunction is detected. From the OR gate 18, a bus cycle termination signal 22 is output. The bus cycle termination signal is a signal to forcibly terminate the current bus cycle. When the malfunction signal 7a is "0", the bus cycle termination signal 50 for usual operation is output from the OR gate 18 as the bus cycle termination signal 22. When the malfunction signal 7a is "1", the OR gate 18 outputs the bus cycle termination signal 22, with the pulse signal 14bs at the high level. In the latter case, to prevent the bus cycle termination signal 50 from outputting the bus cycle signal 22, the bus cycle termination signal 50 is masked by the malfunction signal 7a at the NOR gate 17 so that the bus cycle termination signal 50 cannot be input.

As shown in FIG. 4, the microprocessors 1a, 1b and 1c in triple-processor configuration commonly receive the bus cycle termination signal 22 and the retry instruction signal 13, and individually receive the isolation instruction signals 21a, 21b and 21c respectively. When one of the isolation instruction signals 21a, 21b and 21c becomes effective during execution of a bus cycle, the corresponding microprocessor 1a, 1b or 1c enters logically isolated status after that bus cycle where it does not execute any bus cycle.

When the isolation instruction signal 21a, 21b or 21c becomes ineffective, isolation is automatically canceled causing the bus cycle execution to be started. Further, the microprocessors 1a and 1b receive operation mode instruction signals 23a and 23b for operation mode specification, respectively. The operation mode instruction signal 23a or 23b has "1" for execution mode and "0" for monitor mode. The J-K type flip-flop 19 serves for distinguishing these two modes and has "0" for Q in usual operation. Thus, the operation mode instruction signal 23a is usually "1" so that the microprocessor 1a operates in execution mode, and the operation mode instruction signal 23b is "1" so that the microprocessor 1b operates in monitor mode. The microprocessor 1c is always given "0" as the operation mode instruction signal as shown in the figure and operates only in monitor mode.

If the microprocessor 1a in execution mode makes a malfunction, reconfiguration of the system and retry to the current bus cycle are required. Reconfiguration comprises switching of the microprocessor 1b currently in monitor mode to execution mode for continued processing with the two microprocessors 1b and 1c. Retry is to try the bus cycle being processed at the time of malfunction detection again after the above reconfiguration.

The reconfiguration circuit 200 of the present embodiment has a reconfiguration function with microprocessor switching and a retry function for reactivation of a bus cycle. With reconfiguration function, the isolation instruction signals 21a, 21b and 21c are made effective to isolate the corresponding microprocessors 1a, 1b and 1c before reversing the operation mode instruction signals 23a and 23b. This switches the microprocessor 1b operating in monitor mode to execution mode.

Isolation of a microprocessor means a status where the output signals at the address, data or other lines of the microprocessor becomes tri-state (high impedance), preventing the microprocessor from having electrical influence on external circuits. With retry function, the current bus cycle can be automatically repeated by activating the retry instruction signal 13 synchronizing it with the input of the bus cycle termination signal 22.

Referring now to the flowchart of FIG. 6, the procedure when the malfunction detecting circuit 100 shown in FIG. 1 detects any malfunction at the microprocessor 1a operating in execution mode is described.

When the malfunction signal 7a from the malfunction detecting circuit 100 is input (Step 601), the OR gate 20a outputs the isolation instruction signal 21a for the microprocessor 1a as an effective signal, which logically isolates the microprocessor 1a (Step 602).

The bus cycle start signal 1bs from the microprocessor 1b is input to the flip-flop 10, and it is checked that the microprocessor 1b is executing a bus cycle (Step 603). Then, the isolation instruction signals 21b and 21c corresponding to the microprocessors 1b and 1c are made effective so that the microprocessors 1b and 1c are isolated (Step 604). After that, the retry instruction signal 13 and the bus cycle termination signal 22 are made effective and the bus cycle is forcibly terminated (Step 605).

Next, the operation mode instruction signal 23b becomes "1" to switch the microprocessor 1b to execution mode (Step 606).

The flip-flop 12 is reset by the pulse signal 14ds causing the isolation instruction signals 21b and 21c to become ineffective (Step 607). Then, the above bus cycle is executed again in the reconfigured double-processor configuration as degradation (Step 608).

At the moment the malfunction detecting circuit 100 detects a malfunction at the microprocessor 1a in execution mode, the bus cycles at the microprocessors 1a, 1b and 1c may be in either of the following two cases: the first case where the microprocessor 1a starts its bus cycle earlier than the others, or the second case where the microprocessors 1b and 1c start their bus cycles earlier.

If the microprocessor 1a starts the bus cycle earlier, it is necessary to wait for the microprocessors 1b and 1c to start their bus cycles and check that the bus cycles are started before activating the bus cycle termination signal 22, for proper operation of the retry function. If a microprocessor is forced to terminate its bus cycle when it has not started any bus cycle yet, it cannot make a normal retry because it does not know the bus cycle to be retried.

The J-K type flip-flop 10 is set to have "1" when the bus cycle start signal 1bs of the microprocessor 1b becomes effective ("0"), and is reset to have "0" by the bus cycle termination signal 22 upon termination of a bus cycle. Accordingly, when the flip-flop 10 has "1", it means that the microprocessor 1b is executing a bus cycle.

When the microprocessor 1a operating in execution mode makes a malfunction, the signal 7a immediately changes to "1". Upon this change, the isolation instruction signal 21a from the OR gate 20a immediately becomes effective ("1"), and the microprocessor 1a is logically isolated and stops provision of outputs to outside. When the microprocessor 1b executes a bus cycle, the flip-flop 10 becomes "1", which results in that the output from the AND gate 11 becomes "1" causing the J-K type flip-flop 12 to have "1".

When the value at the flip-flop 12 becomes "1", the retry instruction signal 13 becomes effective ("1"), and the isolation instruction signals 21b and 21c corresponding to the microprocessors 1b and 1c become effective ("1"). The D-type flip-flop 14a, the NOT gate 15 and the AND gate 16 configuring a first transition differentiation circuit converts the signal output from the flip-flop 12 to a pulse signal having a width of 1 clock cycle. The pulse signal generated by this first transition differentiation circuit is output as the pulse signal 14bs with a delay of one clock cycle by the flip-flop 14b, which serves as a delay circuit. The pulse signal 14bs passes the OR gate 18, makes the bus cycle termination signal 22 effective and terminates the bus cycle.

The flip-flop 14c serving as a delay circuit generates a pulse signal 14cs by delaying the pulse signal 14bs by one clock cycle. When the pulse signal 14cs becomes effective ("1"), the J-K type flip-flop 19 has "1", and the operation mode instruction signal 23b becomes "1", causing the microprocessor 1b to be switched from monitor mode to execution mode.

Further, the flip-flop 14d generates a pulse signal 14ds by delaying the pulse signal 14cs by one clock cycle. The pulse signal 14ds resets the J-K type flip-flop 12. When the flip-flop 12 is reset, the isolation instruction signals 21b and 21c become ineffective, resulting in that the microprocessor 1b in execution mode and the microprocessor 1c in monitor mode are restored from isolation status and re-execute the applicable bus cycle for continued processing.

In case either of the microprocessors 1b or 1c in monitor mode malfunctions, there's no need of reconfiguration or retry. In this case, the malfunction signal 7b or 7c becomes effective ("1"), which causes the isolation signal 21b or 21c to be output from the OR gate 20b or 20c for isolation of the malfunctioning microprocessor with the processing continued.

FIG. 7 shows a timing chart showing an example where the microprocessor 1a makes a malfunction, the microprocessor 1b enters execution mode, and the microprocessors 1b and 1c are reconfigured as a double-processor system for operation. As shown in the figure, if the bus cycle start signal 1as becomes effective first, it is not until the signal 1bs becomes effective that the J-K type flip-flop 10 is made effective and the retry instruction signal 13 becomes effective. This makes the signals 14b, 14c and then 14d effective causing the isolation instruction signals 21b and 21c to become effective, and then the bus cycle termination signal 22 to become effective. Then, the operation mode instruction signal 23b becomes "1" and the microprocessor 1b enters execution mode.

Figure 8:
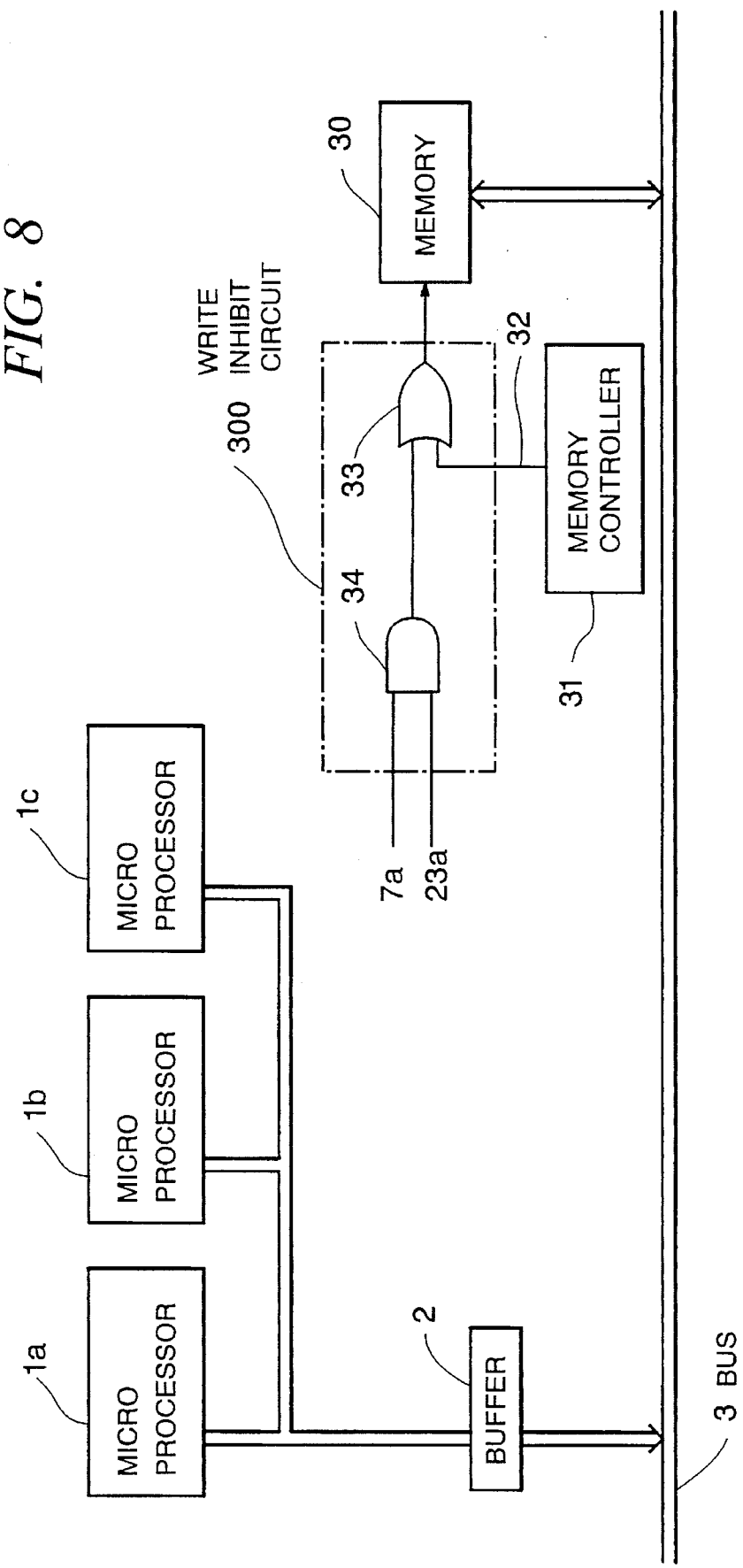
FIG. 8 is a block diagram to show an example of a highly reliable information processor system according to an embodiment to attain the third object of the present invention.

FIG. 8 is a block diagram to show the configuration of a highly reliable information processor system according to an embodiment to attain the third object of the present invention. The system shown in FIG. 8 is actually provided with a malfunction detecting circuit as in FIG. 1 and a reconfiguration circuit 200 as in FIG. 4, but they are omitted for the sake of convenience.

In FIG. 8, as in FIGS. 1 and 4, microprocessors 1a, 1b and 1c in triple-processor configuration are, via a buffer 2, connected with a bus 3. The microprocessors 1a, 1b and 1c are, via the bus 3, write data to or read data out of a memory 30.

If the microprocessor 1a in execution mode is executing a bus cycle for writing to the memory 30 when a malfunction occurs, the bus cycle itself cannot be reliable. In this case, data writing to the memory 30 must be inhibited. For this purpose, the highly reliable information processor system according to this embodiment is provided with a write inhibit circuit 300 to inhibit writing to the memory 30 in the event of malfunctions. The write inhibit circuit 300 comprises an OR gate 33 and an AND gate 34. An input of the OR gate 33 receives a write pulse signal 32 sent from the memory controller 31 for instruction of data write to the memory 30, the other input receives the output from the AND gate 34. The two inputs of the AND gate 34 receives a malfunction signal 7a for the microprocessor 1a sent from the malfunction detecting circuit 100 as shown in FIG. 1 and an operation mode instruction signal 23a for the microprocessor 1a output from the reconfiguration circuit 200 as shown in FIG. 4 respectively. Data write instruction for the memory 30 is given by the write pulse signal 32 generated at the memory controller 31.

When the microprocessor 1a operating in execution mode makes a malfunction, the malfunction signal 7a becomes "1", while the operation mode instruction signal 23a keeps to have "1" until reconfiguration even if a malfunction is detected. Accordingly, the AND gate 34 outputs "1" to the OR gate 33. Thus, the output of the AND gate 34 masks the write pulse signal 32 and thereby prevents any data from being written to the memory 30 until reconfiguration with isolation of the microprocessor 1a.

When the reconfiguration circuit 200 reconfigures the system by switching the microprocessor 1b to execution mode for resuming processing with a double-processor configuration, the mode instruction signal 23a becomes "0" and the AND gate 34 outputs "0", which enables writing to the memory 30 as in usual mode.

Figure 9:
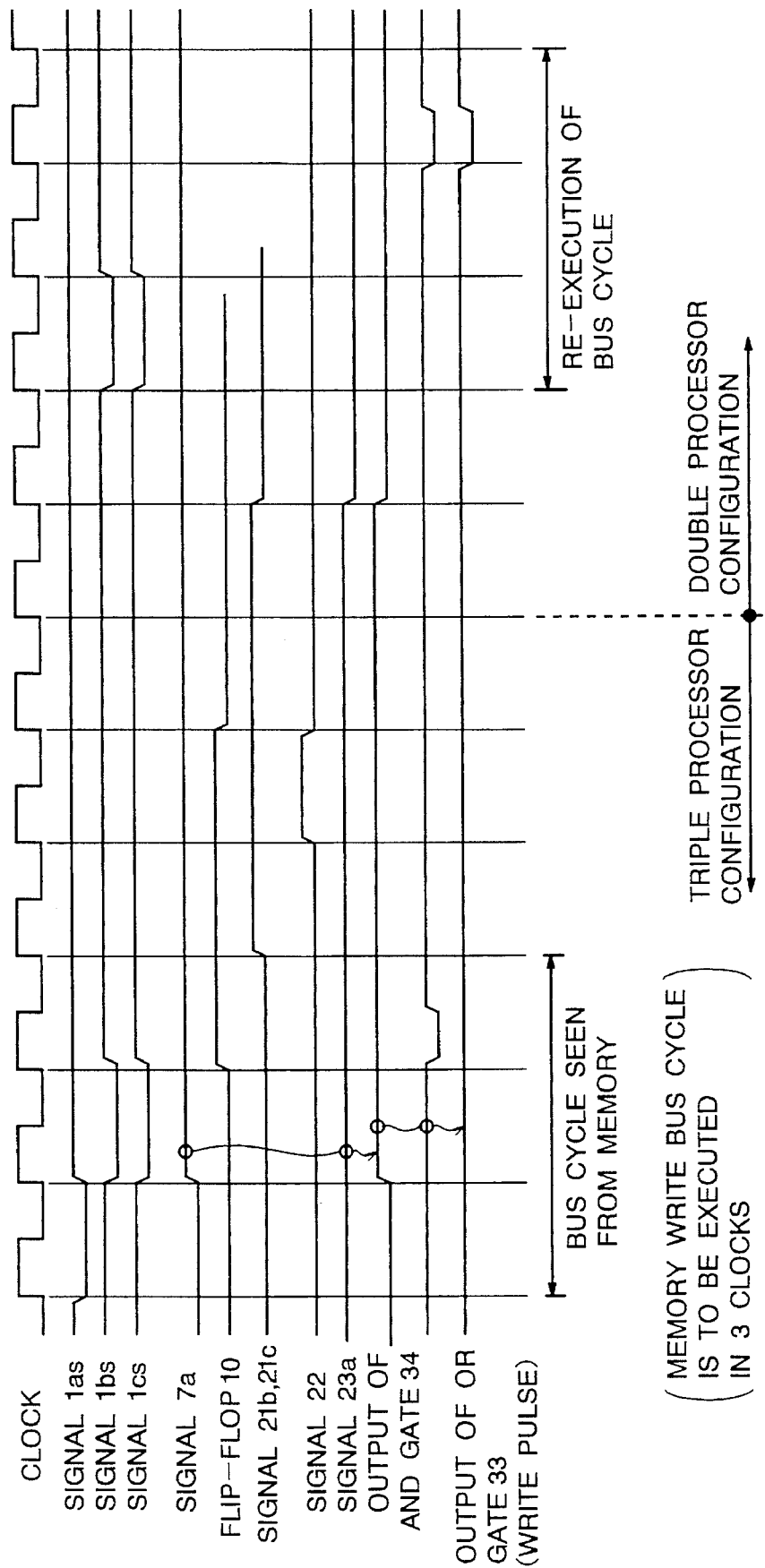
FIG. 9 is a timing chart to shown an example of operation to inhibit data write to the memory.

FIG. 9 is a timing chart to show an example of the operation inhibiting data write to the memory 30. As shown in FIG. 9, when the microprocessor 1a malfunctions and causes discrepancy for the signal 1as, the malfunction signal 7a becomes "1". This causes the AND gate 34 to output "1", which prevents the write pulse signal 32 from influencing the output of the OR gate 33 and inhibits writing to the memory 30.

As understood from the above description, in degraded double-processor configuration with the microprocessors 1b and 1c resulting from a malfunction at one of the microprocessors 1a, 1b and 1c, it is impossible to locate a malfunction even if a malfunction is detected again. Therefore, the processing cannot be continued further in this case.

To avoid such an event, it is necessary to make the period of degraded double-processor operation as short as possible. For this, it is essential to restore the triple-processor configuration as early as possible after detection of malfunction.

The procedure to restore the triple-processor configuration is as follows:

(1) When a malfunction of a microprocessor is detected in triple-processor configuration, interruption requests are sent to all microprocessors immediately.

(2) Upon acceptance of interruption, each microprocessor saves the contents to a predetermined part in the memory.

(3) Request for hardware reset of the three microprocessors is issued.

(4) Upon the above request, the three microprocessors are hardware reset at a time. Then the system is booted up with triple-processor configuration including the microprocessor which made the malfunction.

(5) The contents temporarily saved are restored and processing is resumed from the status before acceptance of interruption.

Figure 10:
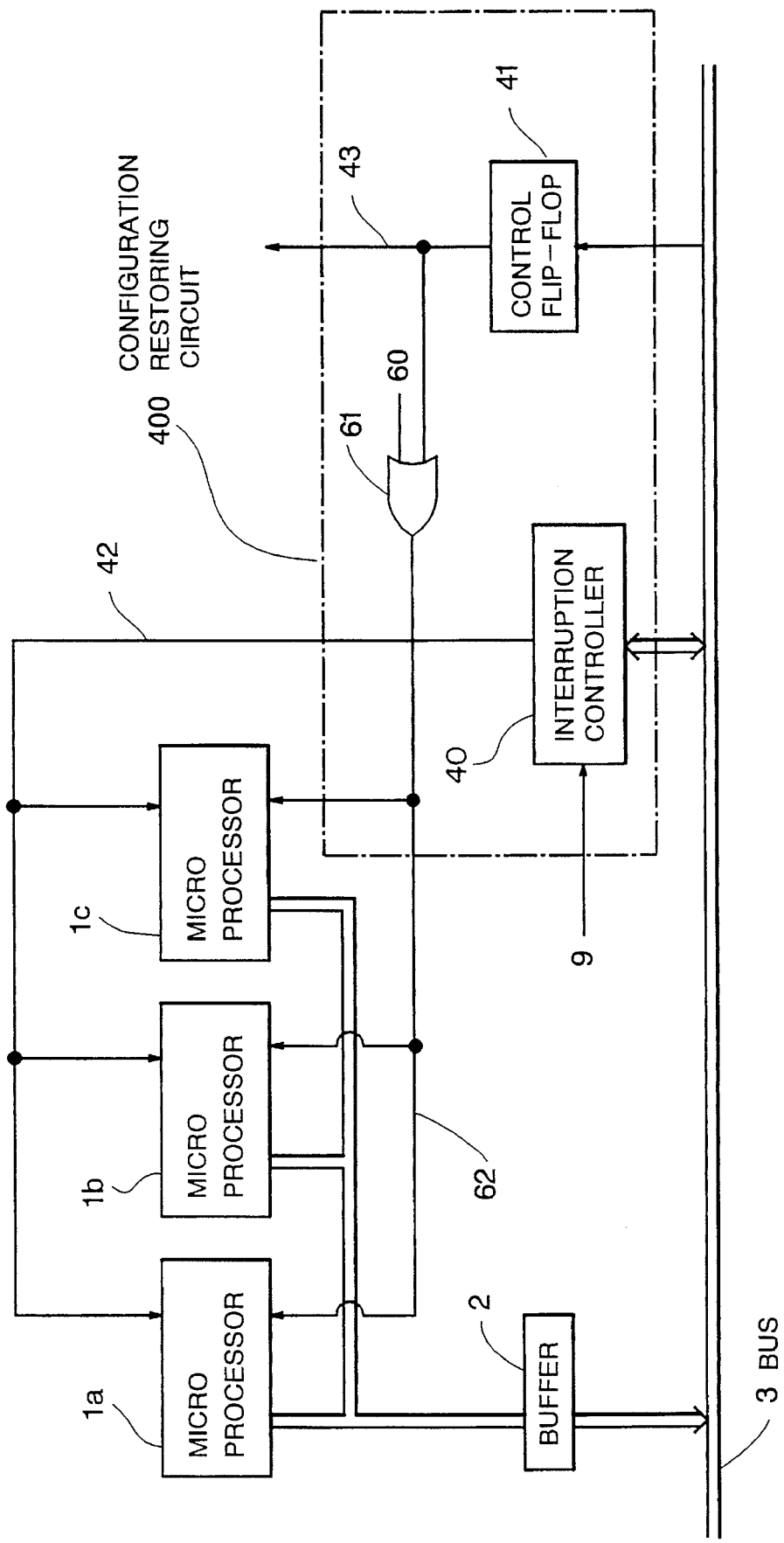
FIG. 10 is a block diagram to show a highly reliable information processor system according to an embodiment to attain the fourth object of the present invention.

FIG. 10 is a block diagram to show the configuration of a highly reliable information processor system according to an embodiment to attain the fourth object of the present invention. The system of FIG. 10 is actually provided with a malfunction detecting circuit 100 as shown in FIG. 1 and a reconfiguration circuit 200 as shown in FIG. 4, but they are omitted in the figure for the sake of convenience.

Similarly to FIGS. 1 and 4, microprocessors 1a, 1b and 1c in triple-processor configuration are, via a buffer 2, connected with a bus 3. The highly reliable information processor system of this embodiment is further provided with a configuration restoring circuit 400 to restore the system from degraded double-processor configuration to the original triple-processor configuration. The configuration restoring circuit 400 comprises an interruption controller 40, a control flip-flop 41 and an OR gate 61.

The interruption controller 40 receives a total malfunction signal 9 to notify the controller 40 of a malfunction at one of the microprocessors 1a, 1b or 1c sent from the malfunction detecting circuit 100 as shown in FIG. 1. This total malfunction signal 9 is one of the interruption factors. The microprocessors 1a, 1b and 1c receive an interruption request signal 42 from the interruption controller 40. The control flip-flop 41 usually keeps "0". For this control flip-flop 41, 1 bit data can be set from the microprocessor 1a, 1b and 1c via the bus 3. When the value "1" is set, it keeps "1" for a certain period and then is reset to "0" automatically. A software reset signal 43 output from the control flip-flop 41, at the OR gate 61, makes a logical sum with a hardware reset signal 60, which is output as a reset signal 62 for the microprocessor 1a, 1b and 1c. The software reset signal 43 is sent to the reset terminals of the flip-flops 6a, 6b and 6c at the malfunction detecting circuit 100 as in FIG. 1 and to the reset terminal of the flip-flop 19 for operation mode switching at the reconfiguration circuit 200 as in FIG. 4.

Figure 11:
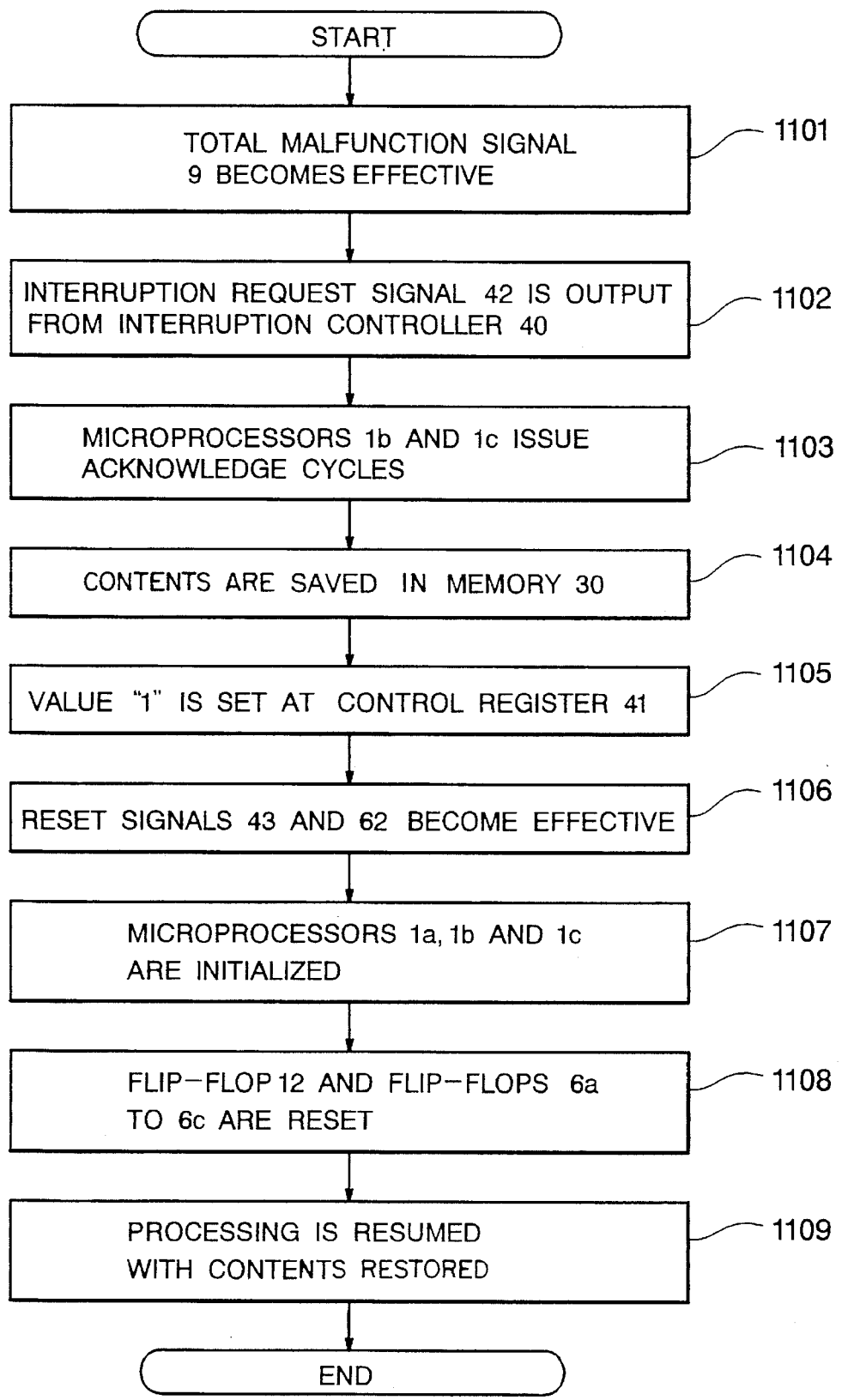
FIG. 11 is a flowchart to illustrate the operation of the highly reliable information processing system shown in FIG. 10.
Figure 12:
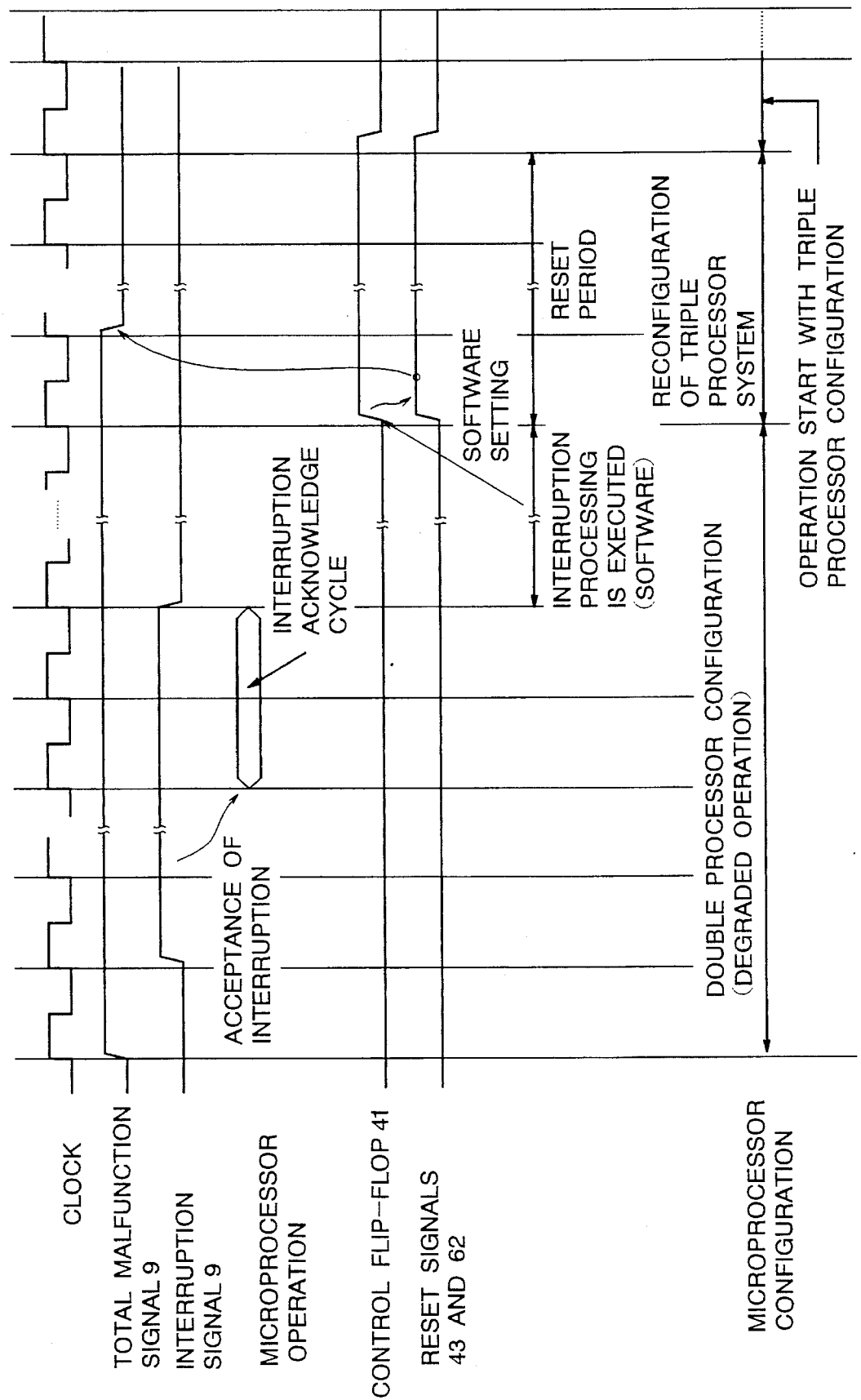
FIG. 12 is a timing chart showing the configuration restoration operation to restore the system degraded to the double-processor configuration to the original triple-processor configuration.

Now referring to a flowchart of FIG. 11 and a timing chart of FIG. 12, contents of processing made by the configuration restoring circuit 400 for restoration of the degraded double-processor system to the original triple-processor system are described below.

When the microprocessor 1a in execution mode makes a malfunction, the total malfunction signal 9 becomes effective (Step 1101), upon which the interruption request signal 42 from the interruption controller 40 becomes effective (Step 1102), causing interruption requests to be sent to the two microprocessors 1b and 1c in degraded operation.

Upon acceptance of the interruption requests, the microprocessors 1b and 1c in degraded double-processor operation after operation mode switching immediately issue an acknowledge cycle (Step 1103) to obtain the interruption information (vector) from the interruption controller 40. The interruption request signal 42 is automatically reset at the end of the interruption acknowledge cycle. The microprocessors 1b and 1c branch to the interruption routine according to the interruption information obtained and start interruption.

At the time of interruption, the microprocessors 1b and 1c save their contents in the predetermined space in the memory 30 (Step 1104) and then set "1" at the control flip-flop 41 (Step 1105). Once set to "1", the control flip-flop 41 keeps the status of "1" for a period sufficient for initialization of a microprocessor and is automatically reset after that.

With the value "1" set at the control flip-flop 41, the reset signal 43 is input to the OR gate 61, which supplies a reset signal 62 with a certain width (Step 1106). This reset signal 62 makes hardware reset for the three microprocessors 1a, 1b and 1c (Step 1107).

At the same time, the J-K type flip-flop 12 to instruct the operation mode using the reset signal 43 and the J-K type flip-flops 6a to 6c which are set to "1" when a malfunction is detected are also initialized (Step 1108), which results in resetting of the total malfunction signal 9.

When the reset signal 62 becomes ineffective, the microprocessor 1a (in execution mode) and the microprocessors 1b and 1c (in monitor mode) make synchronized booting up with the original triple-processor configuration, enabling operation. Thus, the contents saved before resetting are restored (Step 1109), and the processing is continued.

In case either of the microprocessors 1b and 1c in monitor mode makes a malfunction resulting in degraded double-processor configuration, the microprocessors 1a, 1b and 1c are hardware reset with the same procedure as above for restoration of the triple-processor configuration.

As stated above, the highly reliable information processor system of the present invention perfectly detects malfunctions with discrepancy in timing among bus cycles, and avoids discontinuance of processing due to such malfunctions by securing reconfiguration of a double-processor system after malfunction detection and reestablishment of synchronized triple-processor configuration. Thus, an extremely highly reliable system without discontinuance can be realized.

Obviously, various modifications can be made to the above embodiments. It is intended to cover in the appended claims all such modifications and variations as fall within the true spirit and scope of the present invention.

What is claimed is:

1. A highly reliable information processor system comprising:

a first microprocessor operating in an execution mode, second and third microprocessors operating in a monitor mode to check a signal output from said first microprocessor operating in the execution mode against signals output from said second and third microprocessors and said second and third microprocessors starting bus cycles in synchronization with the first microprocessor;

malfunction detecting means for detecting a malfunction in one of said microprocessors based on bus cycle start signals output by said first, second and third microprocessors for providing start timing information when said first, second and third microprocessors synchronously start said bus cycles by comparing said bus cycle start signals to find a discrepancy in the bus cycle start cycles;

reconfiguration means for being responsive to said malfunction detecting means whenever said malfunction detecting means judges that the first microprocessor in the execution mode has a malfunction, for logically isolating said first microprocessor in the execution mode and for switching either of the second or third microprocessors from the monitor mode into the execution mode for degrading a triple-processor configuration to a double-processor configuration, and for executing the bus cycles when said malfunction detecting means has detected said malfunction of said first microprocessor in the execution mode;

means for outputting a signal to instruct said microprocessors to retry the bus cycles when the malfunction signal for said first microprocessor is asserted and the bus cycles are issued by said second and third microprocessors;

isolation signal output means for outputting an isolation signal to logically isolate one of said first, second or third microprocessors synchronously with said retry instruction signal;

bus cycle termination signal output means for outputting a bus cycle termination signal to terminate a currently ongoing bus cycle based on said isolation signal;

means for outputting a switching signal to switch said second or third microprocessor from the monitor mode to the execution mode based on said bus cycle termination signal; and means for inactivating said isolation signal based upon said switching signal.

2. A highly reliable information processor system of claim 1 wherein said isolation signal output means is an OR gate to which said retry instruction signal and the malfunction signal corresponding to said first microprocessor are input.

3. A highly reliable information processor system comprising:

a first microprocessor operating in an execution mode, second and third microprocessors operating in a monitor mode to check a signal output from said first microprocessor operating in the execution mode against signals output from said second and third microprocessors and said second and third microprocessors starting bus cycles in synchronization with the first microprocessor;

malfunction detecting means for detecting a malfunction in one of said microprocessors based on the respective bus cycle start signals output by said first, second and third microprocessors for providing start timing information after said first, second and third microprocessors have synchronously started the respective bus cycles by comparing the respective bus cycle start signals to find a discrepancy in the respective cycles of said first, second and third microprocessors; and reconfiguration means, being responsive to said malfunction detecting means whenever said malfunction detecting means judges that the first microprocessor in the execution mode has a malfunction, for logically isolating said first microprocessor in the execution mode, for switching either of the second or third microprocessors from the monitor mode into the execution mode for degrading a triple-processor configuration to a double-processor configuration, and for executing the bus cycles when said malfunction detecting means has detected said malfunction of said first microprocessor in the execution mode, wherein said reconfiguration means includes;

means for outputting a signal to instruct said microprocessors to retry the bus cycles when the malfunction signal for said first microprocessor is asserted and the bus cycles are issued by said second and third microprocessors;

isolation signal output means for outputting an isolation signal to logically isolate one of said first, second or third microprocessors synchronously with said retry instruction signal;

bus cycle termination signal output means for outputting a bus cycle termination signal to terminate a currently ongoing bus cycle based on said isolation signal;

means for outputting a switching signal to switch said second or third microprocessor from the monitor mode to the execution mode based on said bus cycle termination signal; and means for inactivating said isolation signal based upon said switching signal, wherein said bus cycle termination signal output means includes;

a differentiation circuit to convert said isolation signal into a pulse signal having a width of one clock cycle, and a delay circuit to output the pulse signal as the bus cycle termination signal with a delay of a predetermined number of clock cycles.

4. A highly reliable information processor system of claim 3 further comprising an isolation means for being responsive to said malfunction detecting means whenever said malfunction detecting means judges that said second or third microprocessor operating in the monitor mode has a malfunction, said isolating means logically isolating the malfunctioning second or third microprocessor.

5. A highly reliable information processor system of claim 3 further comprising a write inhibit means, coupled to said malfunction detecting means and said reconfiguration means, for inhibiting a memory write signal, generated by a memory control means, to disable a data write signal provided to a memory when said malfunction detecting means judges that the first microprocessor in the execution mode has a malfunction.

6. A highly reliable information processor system of claim 5 wherein said write inhibit means further comprises an AND gate to which the malfunction signal for said first microprocessor and the switching signal to switch said second or third microprocessor to execution mode are input, and an OR gate to which the output from said AND gate and said memory write signal are input.

7. A highly reliable information processor system of claim 3 further comprising:

an interruption means for issuing an interruption signal to each of said microprocessors in response to detection of the malfunction in one of the first, second or third microprocessors by said malfunction detecting means; and a reset means for resetting and initializing said first, second or third microprocessors upon receipt of said interruption signal.

8. A highly reliable information processor system of claim 7 wherein said reset means comprises a circuit which generates a reset signal to reset said microprocessors for a certain period under control by the microprocessors which accepted said interruptions.

* * * * *